US010420062B2

(12) United States Patent
Kim et al.

(10) Patent No.: US 10,420,062 B2
(45) Date of Patent: Sep. 17, 2019

(54) METHOD OF PERFORMING LOCATION TRACKING USING DRONE AND APPARATUS THEREFOR

(71) Applicant: LG ELECTRONICS INC., Seoul (KR)

(72) Inventors: Myeongjin Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 15/697,400

(22) Filed: Sep. 6, 2017

(65) Prior Publication Data
US 2019/0075543 A1 Mar. 7, 2019

(51) Int. Cl.
H04W 4/00 (2018.01)
H04W 64/00 (2009.01)
B64C 39/02 (2006.01)
H04B 7/185 (2006.01)
H04W 88/08 (2009.01)

(52) U.S. Cl.
CPC ......... H04W 64/006 (2013.01); B64C 39/024 (2013.01); H04B 7/18506 (2013.01); B64C 2201/024 (2013.01); B64C 2201/122 (2013.01); H04W 88/08 (2013.01)

(58) Field of Classification Search
CPC .............................. H04W 64/00; H04W 84/06
See application file for complete search history.

(56) References Cited

U.S. PATENT DOCUMENTS

| 2012/0129550 A1* | 5/2012 | Hannan | G01S 5/0036 455/456.1 |
| 2013/0083683 A1* | 4/2013 | Hwang | H04W 64/00 370/252 |
| 2018/0242101 A1* | 8/2018 | Lin | H04W 4/02 |

* cited by examiner

Primary Examiner — Omoniyi Obayanju
(74) Attorney, Agent, or Firm — Lee Hong Degerman Kang Waimey

(57) ABSTRACT

A method for a drone to measure a location of a user equipment in a wireless communication system can be provided according to one embodiment of the present specification. In this case, the method can include the steps of performing an initial access procedure with a base station, receiving SRS configuration information of the user equipment from the base station, receiving an SRS from the user equipment based on the SRS configuration information of the user equipment, and transmitting location measurement information, which is measured based on the received SRS, to the base station.

9 Claims, 16 Drawing Sheets

FIG. 7
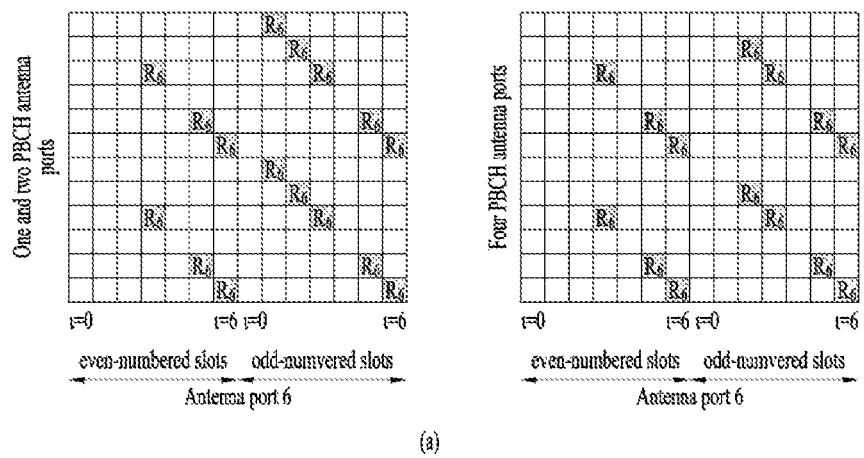
(a)
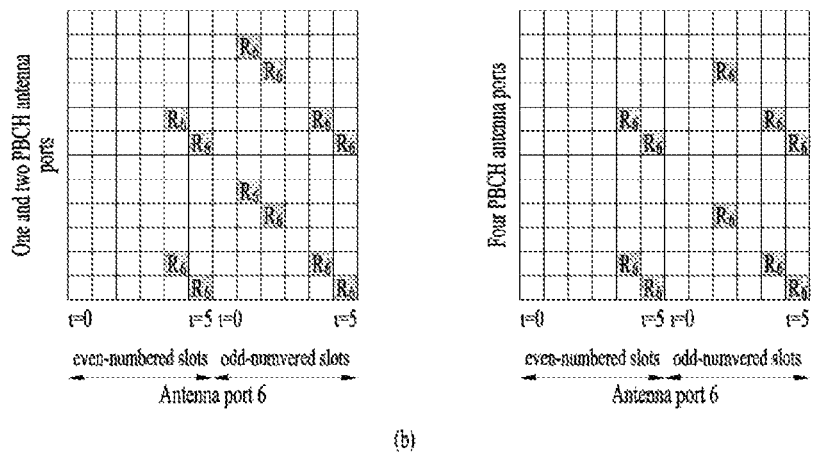
(b)

METHOD OF PERFORMING LOCATION TRACKING USING DRONE AND APPARATUS THEREFOR

BACKGROUND OF THE INVENTION

Field of the Invention

The present specification relates to a wireless communication system, and more particularly, to a method of performing location tracking using a drone and an apparatus therefor.

Discussion of the Related Art

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

3GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms. The 5G technology requires an eNB to have more UE connectivity and it is anticipated that the connectivity required by the 5G is going to be increased up to maximum $1,000,000/km^2$.

As more communication devices require greater communication capacity, necessity for mobile broadband communication, which is enhanced compared to a legacy radio access technology (RAT), is emerging. Moreover, discussion on a communication system to be designed in consideration of a service/UE sensitive to reliability and latency is in progress. Introduction of a next generation radio access technology (RAT) is being discussed in consideration of the enhanced mobile broadband communication (eMBB), the massive MTC (mMTC), URLLC (ultra-reliable and low latency communication), and the like. In the following, for clarity, the technology is referred to as a New RAT.

Recently, utilization of a drone is increasing and discussion on methods of efficiently performing communication between a drone and legacy communication devices is in progress. For example, a drone may correspond to a flying object flied by a control signal of a radio wave and a device performing communication.

SUMMARY OF THE INVENTION

Accordingly, the present invention is directed to an apparatus and method thereof that substantially obviate one or more problems due to limitations and disadvantages of the related art.

An object of the present invention is to provide a method of performing location tracking using a drone in a wireless communication system and an apparatus therefor.

Another object of the present invention is to provide a method of performing location tracking in consideration of mobility of a drone and an apparatus therefor.

The other object of the present invention is to provide a method of performing location tracking through a drone based on a reference signal used in a legacy system and an apparatus therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with one embodiment of the present specification, a method of measuring a location of a user equipment by a drone in a wireless communication system, the method comprising: performing an initial access procedure with a base station; receiving SRS (sounding reference signal) configuration information of the user equipment from the base station; receiving an SRS from the user equipment based on the SRS configuration information of the user equipment; and transmitting location measurement information measured based on the received SRS, to the base station.

In accordance with one embodiment of the present specification, a drone measuring a location of a user equipment in a wireless communication system, comprising: a reception module configured to receive a signal; a transmission module configured to transmit a signal; and a processor configured to control the reception module and the transmission module, wherein the processor is further configured to: perform an initial access procedure with a base station, receive SRS (sounding reference signal) configuration information of the user equipment from the base station using the reception module, receive an SRS from the user equipment based on the SRS configuration information of the user equipment using the reception module, the processor configured to transmit location measurement information measured based on the received SRS, to the base station using the transmission module.

Also, the followings may commonly be applied to the method and apparatus for measuring a location of a user equipment in a wireless communication system.

In accordance with one embodiment of the present specification, the SRS configuration information of the user equipment comprises at least one of SRS bandwidth information and SRS search window information.

In accordance with one embodiment of the present specification, the drone searches for the SRS transmitted by the user equipment in the SRS search window period.

In accordance with one embodiment of the present specification, the SRS search window is configured in a subframe unit.

In accordance with one embodiment of the present specification, the drone receives TA (time advance) from the base station and matches a subframe index of the drone with a subframe index of the base station based on the received TA.

In accordance with one embodiment of the present specification, the SRS search window is configured in a sampling rate unit.

In accordance with one embodiment of the present specification, the drone receives subframe number information on a start point and an end point of the SRS search window and offset information in a subframe from the base station.

In accordance with one embodiment of the present specification, the drone performs the initial access procedure with the base station when the drone moves to a predetermined position.

In accordance with one embodiment of the present specification, if the drone moves to a predetermined position, the drone further transmits information to the base station to indicate that the drone has arrived at the predetermined position when the drone performs the initial access procedure with the base station.

In accordance with one embodiment of the present specification, the location measurement information corresponds to TOA (time of arrival) indicating information on time at which the SRS transmitted from the user equipment is arrived.

In accordance with one embodiment of the present specification, the base station receives the location measurement information from a plurality of drones and measures the location of the user equipment based on a plurality of the received location measurement information.

In accordance with one embodiment of the present specification, the base station transmits a plurality of the received location measurement information to a location tracking server.

In accordance with one embodiment of the present specification, C-RNTI of each of a plurality of the drones and cell ID information are transmitted to the location tracking server as well when the base station transmits a plurality of the received location measurement information to the location tracking server.

Following items can be commonly applied to a method of measuring a location of a terminal using a drone in a wireless communication system and an apparatus therefor.

According to the present invention, it is able to provide a method of performing location tracking using a drone in a wireless communication system and an apparatus therefor.

According to the present invention, it is able to provide a method of performing location tracking in consideration of mobility of a drone and an apparatus therefor.

According to the present invention, it is able to provide a method of performing location tracking through a drone based on a reference signal used in a legacy system and an apparatus therefor.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram for RE mapping of a PRS;

DETAILED DESCRIPTION OF THE INVENTION

Figure 1:
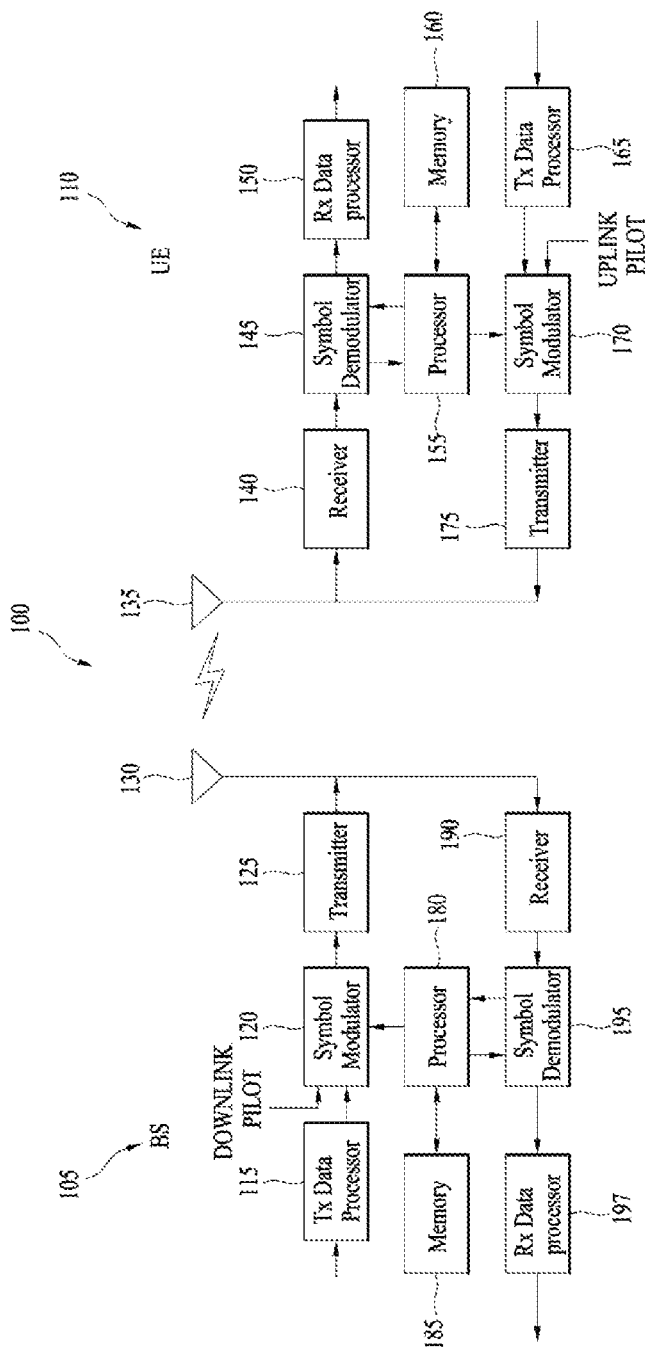
FIG. 1 is a block diagram for configurations of a base station 105 and a terminal (or drone) 110.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes a 3rd Generation Partnership Project (3GPP) Long Term Evolution (LTE) system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a User Equipment (UE), a Mobile Station (MS), an Advanced Mobile Station (AMS) and the like. And, assume that a Base Station (BS) is a common name of such a random node of a network stage communicating with a terminal as a Node B (NB), an eNode B (eNB), an Access Point (AP) and the like. Although the present specification is described based on 3GPP LTE system or 3GPP LTE-A system, contents of the present invention may be applicable to various kinds of other communication systems.

In a mobile communication system, a UE is able to receive information in Downlink (DL) and is able to transmit information in Uplink (UL) as well. Information transmitted or received by the UE may include various kinds of data and control information. In accordance with types and usages of the information transmitted or received by the UE, various physical channels may exist.

The following descriptions are usable for various wireless access systems including Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like. CDMA can be implemented by such a radio technology as Universal Terrestrial Radio access (UTRA), CDMA 2000 and the like. TDMA can be implemented with such a radio technology as Global System for Mobile communications/General Packet Radio Service/Enhanced Data Rates for GSM Evolution (GSM/GPRS/EDGE). OFDMA can be implemented with such a radio technology as IEEE 802.11 (Wi-Fi), IEEE 802.16 (WiMAX), IEEE 802.20, E-UTRA (Evolved UTRA), etc. UTRA is a part of Universal Mobile Telecommunications System (UMTS). 3GPP LTE is a part of Evolved UMTS (E-UMTS) that uses E-UTRA. The 3GPP LTE employs OFDMA in DL and SC-FDMA in UL. And, LTE-A is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a BS 105 and a UE 110 in a wireless communication system 100.

Although one BS 105 and one UE 110 (D2D UE included) are shown in the drawing to schematically represent the wireless communication system 100, the wireless communication system 100 may include at least one BS and/or at least one UE.

Referring to FIG. 1, the BS 105 may include a Transmission (Tx) data processor 115, a symbol modulator 120, a transmitter 125, a transceiving antenna 130, a processor 180, a memory 185, a receiver 190, a symbol demodulator 195 and a received data processor 197. And, the UE 110 may include a Tx data processor 165, a symbol modulator 170, a transmitter 175, a transceiving antenna 135, a processor 155, a memory 160, a receiver 140, a symbol demodulator 155 and a received data processor 150. Although the BS/UE 105/110 includes one antenna 130/135 in the drawing, each of the BS 105 and the UE 110 includes a plurality of antennas. Therefore, each of the BS 105 and the UE 110 of the present invention supports a Multiple Input Multiple Output (MIMO) system. And, the BS 105 according to the present invention may support both Single User-MIMO (SU-MIMO) and Multi User-MIMO (MU-MIMO) systems.

In DL, the Tx data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of Frequency Division Multiplexing (FDM), Orthogonal Frequency Division Multiplexing (OFDM), or Code Division Multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the UE 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the Tx data processor 115 in the BS 105, respectively.

In the UE 110 in UL, the Tx data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates a UL signal. This UL signal is then transmitted to the BS 105 via the antenna 135.

In the BS 105, the UL signal is received from the UE 110 via the antenna 130. The receiver 190 processes the received UL signal and then obtains samples. Subsequently, the symbol demodulator 195 processes the samples and then provides pilot symbols received in UL and a data symbol estimated value. The received data processor 197 processes the data symbol estimated value and then reconstructs the traffic data transmitted from the UE 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of Open System Interconnection (OSI) model well known to communication systems. A physical layer belongs to the 1st layer and provides an information transfer service via a physical channel Radio Resource Control (RRC) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

And, for example, the terminal 110 may correspond to a drone. In this case, for example, the drone may correspond to a flying object capable of performing communication. For example, the drone may have a structure identical to the structure of the terminal 110. The drone may correspond to a device capable of performing communication with other terminals, by which the present invention may be non-limited.

Figure 2:
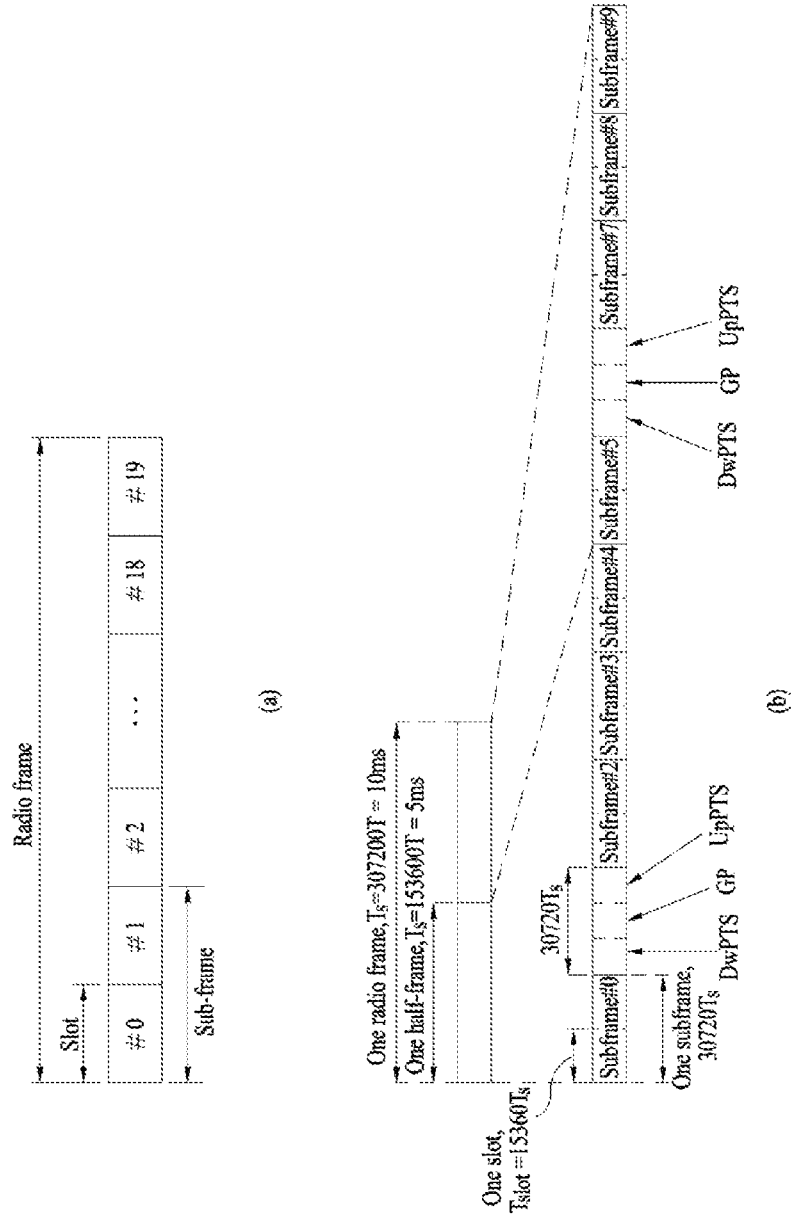
FIG. 2 is a diagram for an example of a radio frame structure used in a wireless communication system.

FIG. 2 is a diagram for an example of a radio frame structure used in a wireless communication system. Specifically, FIG. 2 (*a*) illustrates an exemplary structure of a radio frame which can be used for frequency division multiplexing (FDD) in 3GPP LTE/LTE-A system and FIG. 2 (*b*) illustrates an exemplary structure of a radio frame which can be used for time division multiplexing (TDD) in 3GPP LTE/LTE-A system.

Referring to FIG. 2, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time period reserved for DL transmission and UpPTS is a time period reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120.T, | 20480 · $T_s$ | | |

TABLE 2-continued

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Figure 3:
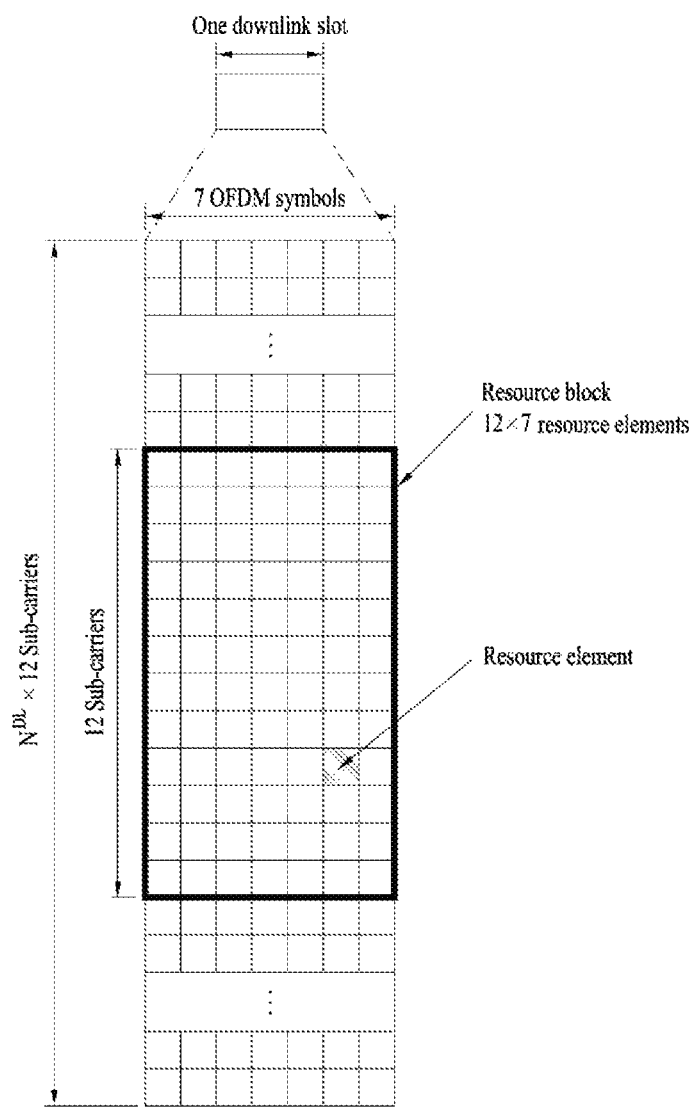
FIG. 3 is a diagram for an example of a downlink (DL)/uplink (UL) slot structure in a wireless communication system.

Referring to FIG. 3, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 3, a signal transmitted in each slot may be expressed by a resource grid including $N^{DL/UL}_{RB} * N^{RB}_{sc}$ subcarriers and $N^{DL/UL}_{symb}$ OFDM symbols. $N_{DL}^{RB}$ denotes the number of RBs in a DL slot and $N^{UL}_{RB}$ denotes the number of RBs in a UL slot. $N_{DL}^{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 3 for convenience of description, embodiments of the present invention are similarly applicable to subframes having a different number of OFDM symbols. Referring to FIG. 3, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} 1 - 1$ in the time domain.

In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index). A VRB corresponds to a logical resource allocation unit which is introduced to allocate a resource. The VRB has a size identical to a size of a PRB. The VRB is classified into a localized type VRB and a distributed type VRB according to a scheme of mapping the VRB to a PRB. Since VRBs of the localized type are directly mapped to PRBs, a VRB number (or VRB index) directly corresponds to a PRB number. In particular, it becomes $n_{PRB}=n_{VRB}$. Numbers ranging from 0 to $N^{DL}_{PRB}-1$ are assigned to the VRBs of the localized type and $N^{DL}_{VRB}=N^{DL}_{RB}$. Hence, according to the localized mapping scheme, a VRB having the same VRB number is mapped to a PRB of the same PRB number in a first slot and a second slot. On the contrary, a VRB of the distributed type is mapped to a PRB by passing through interleaving. Hence, a VRB of the distributed type including the same VRB number can be mapped to PRBs of a different number in a first slot and a second slot. Two PRBs each of which is located at each slot of a subframe and having the same VRB number are referred to as a VRB pair.

Figure 4:
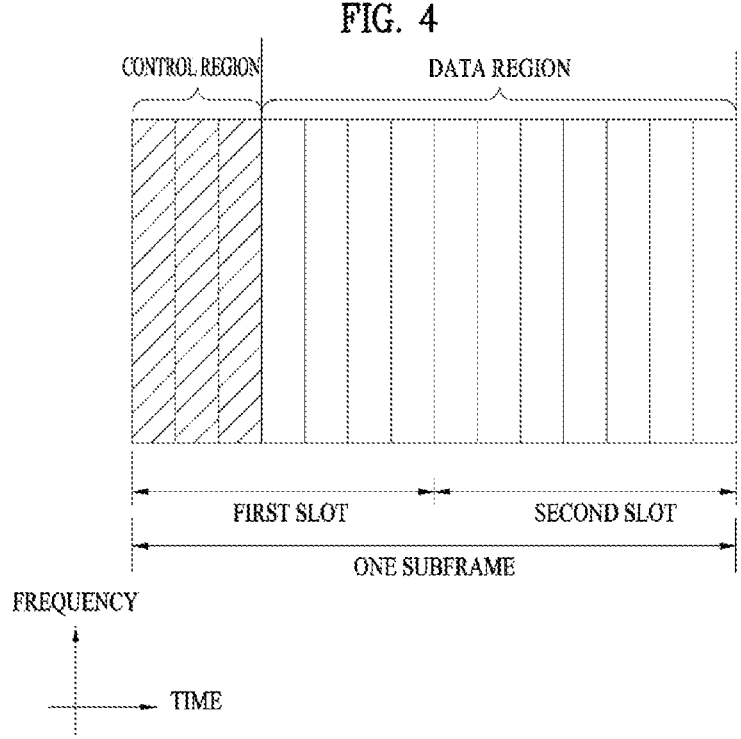
FIG. 4 is a diagram for an example of a downlink (DL) subframe structure used in 3GPP LTE/LTE-A system.

FIG. 4 illustrates a structure of a DL subframe used in 3GPP LTE/LTE-A system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PCFICH carries a HARQ (Hybrid Automatic Repeat Request) ACK/NACK (acknowledgment/negative-acknowledgment) signal in response to UL transmission.

The control information transmitted through the PDCCH will be referred to as downlink control information (DCI). The DCI includes resource allocation information for a UE or UE group and other control information. For example, the DCI includes transmit format and resource allocation information of a downlink shared channel (DL-SCH), transmit format and resource allocation information of an uplink shared channel (UL-SCH), paging information of a paging channel (PCH), system information on a DL-SCH, resource allocation information of a upper layer control message such as a random access response transmitted on PDSCH, a transmit power control command for individual UEs belonging to a UE group, a transmit power control command, activation indication information of VoIP (Voice over IP), a DAI (downlink assignment index), and the like. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

In general, a DCI format capable of being transmitted to a UE varies depending on a transmission mode (TM) set to the UE. In other word, if a UE is configured by a specific transmission mode, it may be able to use a prescribed DCI format(s) corresponding to the specific transmission mode only rather than all DCI formats.

A PDCCH is formed by aggregating one or more consecutive Control Channel Elements (CCEs). A CCE is a logical allocation unit used to provide a PDCCH at a coding rate based on the state of a radio channel A CCE corresponds to a plurality of resource element groups (REGs). For example, one CCE corresponds to 9 REGs and one REG corresponds to 4 REs. 3GPP LTE defines a CCE set where PDCCH is able to be positioned for each of the user equipments. The CCE set for which a user equipment is able to search its own PDCCH is called a PDCCH search space, simply a search space (SS). An individual resource to which PDCCH is able to be transmitted thereto within the SS is called a PDCCH candidate. A set of PDCCH candidates to be monitored by a UE is defined as a search space. In 3GPP LTE/LTE-A system, a search space for each DCI format may have a different size and a dedicated search space and a common search space are separately defined. The dedicated search space corresponds to a UE-specific search space and may be individually set for each of user equipments. The common search space is configured for a plurality of UEs. Aggregation levels for defining the search space are shown in the following.

TABLE 3

| Search Space $S_k^{(L)}$ | | | |
|---|---|---|---|
| Type | Aggregation Level L | Size[in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

One PDCCH candidate corresponds to 1, 2, 4, or 8 CCEs according to a CCE aggregation level. An eNB transmits actual PDCCH (DCI) in a random PDCCH candidate belonging to a search space and a UE monitors the search space to find out PDCCH (DCI). In this case, the verb 'monitor' means that the UE attempts to decode each of the PDCCH candidates belonging to the search space in accordance with PDCCH formats monitored by the UE. The UE monitors a plurality of PDCCHs and may be able to detect PDCCH of the UE. Basically, since the UE is unable to know a position from which the PDCCH of the UE is transmitted, the UE attempts to decode all PDCCHs of a corresponding DCI format in every subframe until PDCCH including an identifier of the UE is detected. This process is referred to as blind detection (blind decoding (BD)).

An eNB can transmit data for a UE or a UE group via a data region. The data transmitted via the data region is referred to as a user data. In order to transmit the user data, PDSCH (physical downlink shared channel) can be assigned to the data region. PCH (paging channel) and DL-SCH (downlink-shared channel) are transmitted via the PDSCH. A UE decodes control information transmitted on the PDCCH to read the data transmitted via the PDSCH. Information indicating a UE or a UE group to which the data of the PDSCH is transmitted and information indicating a method for the UE or the UE group to receive and decode the PDSCH data are transmitted in a manner of being included in the PDCCH. For example, it is assumed that a specific PDCCH is CRC-masked with a Radio Network Temporary Identity (RNTI) "A", and information about data transmitted using a radio resource (e.g., frequency location) "B" and transmission format information (e.g., transmission block size, modulation scheme, coding information, or the like) "C" is transmitted via a specific DL subframe. In this case, a UE monitors a PDCCH using its own RNTI information, and if one or more UEs having "A" RNTI are present, the UEs receive the PDCCH and receive the PDSCH indicated by "B" and "C" through the information about the received PDCCH.

In order for a UE to demodulate a signal received from an eNB, it is necessary to have a reference signal (RS) to be compared with a data signal. The reference signal corresponds to a signal of a predetermined specific waveform transmitted to the UE by the eNB or to the eNB by the UE and is referred to as a pilot signal as well. Reference signals are classified into a cell-specific RS commonly used by all UEs in a cell and a demodulation RS (DM RS) dedicated to a specific UE. A DM RS transmitted by an eNB to demodulate downlink data of a specific UE is referred to as a UE-specific RS. In DL, it may transmit a DM RS and a CRS together or transmit either the DM RS or the CRS only. In this case, if the DM RS is transmitted only in DL without the CRS, since the DM RS, which is transmitted by applying the same precoder with data, is used for demodulation purpose only, it is necessary to separately provide an RS for measuring a channel. For example, in 3GPP LTE (-A), an additional RS for measuring a channel, i.e., a CSI-RS, is transmitted to a UE to make the UE measure channel state information. Unlike a CRS transmitted in every subframe, the CSI-RS is transmitted with a prescribed transmission period consisting of a plurality of subframes based on a fact that a channel state is not considerably changed over time.

Figure 5:
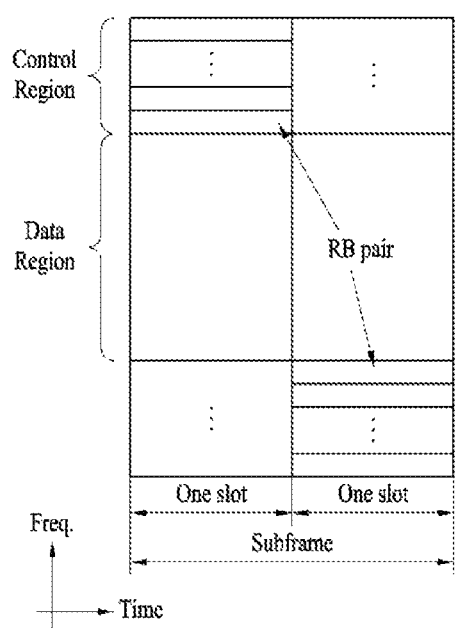
FIG. 5 is a diagram for an example of an uplink (UL) subframe structure used in 3GPP LTE/LTE-A system.

FIG. 5 is a diagram for an example of an uplink (UL) subframe structure used in 3GPP LTE/LTE-A system.

Referring to FIG. 5, an UL subframe can be divided into a control region and a data region in frequency domain. At least one PUCCH (physical uplink control channel) can be assigned to the control region to transmit uplink control information (hereinafter abbreviated UCI). At least one PUSCH (physical uplink shared channel) can be assigned to the data region to transmit user data.

In an UL subframe, subcarriers far from a DC (direct current) subcarrier are utilized as a control region. In other related feedback information includes an RI (rank indicator) and a PMI (precoding matrix indicator).

An amount of control information (UCI) capable of being transmitted by a UE in a subframe depends on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, the last SC-FDMA symbol of the subframe is also excluded. A reference signal is used for coherent detection of PUCCH. PUCCH supports various formats depending on transmitted information.

Table 4 in the following shows a mapping relation between a PUCCH format and UCI in LTE/LTE-A system.

TABLE 4

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or R + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | | word, subcarriers positioned at both ends of an UL transmission bandwidth are assigned to transmit UCI. The DC subcarrier is a remaining component not used for transmitting a signal and mapped to a carrier frequency $f_0$ in a frequency up converting process. PUCCH for one UE is assigned to an RB pair in one subframe. RBs belonging to the RB pair occupy a subcarrier different from each other in two slots, respectively. This sort of PUCCH can be represented in a manner that the RB pair allocated to the PUCCH is frequency hopped on a slot boundary. Yet, if a frequency hopping is not applied, the RB pair occupies an identical subcarrier.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for PDCCH and/or a DL data packet (e.g., codeword) on PDSCH. This information indicates whether or not PDCCH or PDSCH is successfully received. HARQ-ACK 1 bit is transmitted in response to a single DL codeword. HARQ-ACK 2 bits are transmitted in response to two DL codewords. HARQ-ACK response includes a positive ACK (simple, ACK), a negative ACK (hereinafter, NACK), DTX (discontinuous transmission), or NACK/DTX. In this case, the term HARQ-ACK is used in a manner of being mixed with HARQ ACK/NACK, ACK/NACK.

CSI (channel state information): Feedback information on a DL channel. MIMO (multiple input multiple output)-

Referring to Table 4, a PUCCH format 1 is mainly used for transmitting ACK/NACK and a PUCCH format 2 is mainly used for transmitting channel state information (CSI) such as CQI/PMI/RI, and a PUCCH format 3 is mainly used for transmitting ACK/NACK information.

In general, in order for a network to obtain location information of a UE, various methods are used in a cellular communication system. As a representative method, a UE receives PRS (positioning reference signal) transmission-related configuration information of a base station from a higher layer signal and measures PRSs transmitted by cells adjacent to the UE to calculate location-related information of the UE using a positioning scheme such as OTDOA (observed time difference of arrival) and forwards the calculated information to the network. Besides, an assisted global navigation satellite system (A-GNSS) positioning scheme, enhanced cell-ID (E-CID) techniques, uplink time difference of arrival (UTDOA), and the like exist. The abovementioned positioning schemes can be utilized for various location-based services (e.g., advertising, location tracking, emergency communication means, etc.).

In LTE system, LPP (LTE positioning protocol) is defined to support the OTDOA scheme. According to the LPP, OTDOA-ProvideAssistanceData having a configuration described in the following is transmitted to a UE as an IE (information element).

TABLE 5

```
■ ASN1START
OTDOA-ProvideAssistanceData ::= SEQUENCE {
otdoa-ReferenceCellInfo          OTDOA-ReferenceCellInfo
    A. OPTIONAL,                 -- Need ON
- otdoa-NeighbourCellInfo        OTDOA-NeighbourCellInfoList
    A. OPTIONAL,                 -- Need ON
otdoa-Error
    B. OTDOA-Error
        OPTIONAL,
    ■ Need ON
- ...
}
-- ASN1STOP
```

In this case, OTDOA-ReferenceCellInfo corresponds to a reference cell for measuring RSTD and can be configured as follows.

TABLE 6

```
■ ASN1START
OTDOA-ReferenceCellInfo ::= SEQUENCE {
-  physCellId                            INTEGER (0..503),
-  cellGloband                           ECGI
OPTIONAL,            -- Need ON
-  earfcnRef                             ARFCN-ValueEUTRA
OPTIONAL,            -- Cond NotSameAsServ0
   antennaPortConfig          ENUMERATED {ports1-or-2, ports4, ... }
-  OPTIONAL,                  -- Cond NotSameAsServ1
-  cpLength                              ENUMERATED { normal,
      extended, ... },
-  prsInfo                               PRS-Info
OPTIONAL,            -- Cond PRS...,
-  [[ earfcnRef-v9a0                    ARFCN-ValueEUTRA-v9a0
OPTIONAL            -- Cond NotSameAsServ2]]
}
-- ASN1STOP
```

In this case, conditional presences are shown in the following.

TABLE 7

| Conditional presence | description |
| --- | --- |
| NotSameAsServ0 | This field is absent if earfcnRef-v9a0 is present. Otherwise, the field is mandatory present if the EARFCN of the OTDOA assistance data reference cell is not the same as the EARFCN of the target devices's current primary cell. |
| NotSameAsServ1 | The field is mandatory present if the antenna port configuration of the OTDOA assistance data reference cell is not the same as the antenna port configuration of the target devices's current primary cell. |
| NotSameAsServ2 | The field is absent if earfcnRef is present. Otherwise, the field is mandatory present if the EARFCN of the OTDOA assistance data reference cell is not the same as the EARFCN of the target devices's current primary cell. |
| PRS | The field is mandatory present if positioning reference signals are available in the assistance data reference cell; otherwise it is not present. |

Each individual field of the OTDOA-ReferenceCellInfo is described in the following.

TABLE 8

OTDOA-ReferenceCellInfo field description physCellId
This field specifies the physical cell identity of the assistance data reference cell.
cellGlobalId
This field specifies the ECGI, the globally unique identity of a cell in E-UTRA, of the assistance data reference cell. The server should include this field if it considers that it is needed to resolve ambiguity in the cell indicated by physCellId.
earfcnRef
This field specifies the EARFCN of the assistance data reference cell.
antennaPortConfig
This field specifies whether 1 (or 2) antenna port(s) or 4 antenna ports for cell specific reference signals (CRS) are used in the assistance data reference cell.
cpLength
This field specifies the cyclic prefix length of the assistance data reference cell PRS if the prsInfo field is present, otherwise this field specifies the cyclic prefix length of the assistance data reference cell CRS.
prsInfo
This field specifies the PRS configuration of the assistance data reference cell.

Meanwhile, OTDOA-NeighbourCellInfo corresponds to cells (e.g., an eNB or a TP) becoming a target of RSTD measurement and can include information on maximum 24 neighbor cells according to each frequency layer for maximum 3 frequency layers. In particular, it may be able to inform a UE of information on 72 (3*24) cells in total.

TABLE 9

```
■ ASN1START
OTDOA-NeighbourCellInfoList ::= SEQUENCE (SIZE
    (1..maxFreqLayers)) OF
    OTDOA-NeighbourFreqInfo
OTDOA-NeighbourFreqInfo ::= SEQUENCE (SIZE (1..24)) OF OTDOA-
    NeighbourCellInfoElement
OTDOA-NeighbourCellInfoElement ::= SEQUENCE {
    physCellId                              INTEGER
-   (0..503),
-   cellGlobalId                            ECGI
OPTIONAL,           -- Need ON
-   earfcn                                  ARFCN-
    alueEUTRA OPTIONAL,       -- Cond NotSameAsRef0
-   cpLength                                ENUMERATED
        {normal, extended, ... }
OPTIONAL,           -- Cond NotSameAsRef1
    prsInfo                                 PRS-Info
OPTIONAL,           -- Cond NotSameAsRef2
    antennaPortConfig           ENUMERATED {ports-1-or-2,
        ports-4, ... }
OPTIONAL,                 -- Cond NotsameAsRef3
    slotNumberOffset                        INTEGER (0..19)
        OPTIONAL,             -- Cond NotSameAsRef4
    prs-SubframeOffset                      INTEGER        (0..1279)
        OPTIONAL,             -- Cond InterFreq
-   expectedRSTD                            INTEGER
    (0..16383),
-   expectedRSTD-Uncertainty      INTEGER (0..1023),
- - ...,
-   [[ earfcn-v9a0                         ARFCN-ValueEUTRA-v9a0
        OPTIONAL           -- Cond NotSameAsRef5]]
-   }
-   maxFreqLayers      INTEGER ::= 3
-- ASN1STOP
```

In this case, conditional presences are shown in the following.

TABLE 10

| Conditional presence | Description |
|---|---|
| NotSameAsRef0 | The field is absent if earfcn-v9a0 is present. If earfcn-v9a0 is not present, the field is mandatory present if the EARFCN is not the same as for the assistance data reference cell; otherwise it is not present. |
| NotSameAsRef1 | The field is mandatory present if the cyclic prefix length is not the same as for the assistance data reference cell; otherwise it is not present. |
| NotSameAsRef2 | The field is mandatory present if the PRS configuration is not the same as for the assistance data reference cell; otherwise it is not present. |
| NotSameAsRef3 | The field is mandatory present if the antenna port configuration is not the same as for the assistance data reference cell; otherwise it is not present |
| NotSameAsRef4 | The field is mandatory present if the slot timing is not the same as for the assistance data reference cell; otherwise it is not present. |
| NotSameAsRef5 | The field is absent if earfcn is present. If earfcn is not present, the field is mandatory present if the EARFCN is not the same as for the assistance data reference cell; otherwise it is not present. |
| InterFreq | The field is optionally present, need OP, if the EARFCN is not the same as for the assistance data reference cell; otherwise it is not present. |

Each individual field of the OTDOA-NeighbourCellInfo-List is described in the following.

TABLE 11

OTDOA-NeighbourCellInfoList field description physCellId
This field specifies the physical cell identity of the assistance data reference cell.
cellGloballd
This field specifies the ECGI, the globally unique identity of a cell in E-UTRA, of the assistance data reference cell. The server should include this field if it considers that it is needed to resolve ambiguity in the cell indicated by physCellId.
earfcnRef
This field specifies the EARFCN of the assistance data reference cell.
antennaPortConfig
This field specifies whether 1 (or 2) antenna port(s) or 4 antenna ports for cell specific reference signals (CRS) are used in the assistance data reference cell.
cpLength
This field specifies the cyclic prefix length of the neigbour cell PRS if PRS are present in this neighbour cell, otherwise this field specifies the cyclic prefix length of CRS in this neighbour cell.
prsInfo
This field specifies the PRS configuration of the neighbour cell.
When the EARFCN of the neighbour cell is the same as for the assistance data reference cell, the target device may assume that each PRS positioning occasion in the neighbour cell at least partially overlaps with a PRS positioning occasion in the assistance data reference cell where the maximum offset between the transmitted PRS positioning occasions may be assumed to not exceed half a subframe.
When the EARFCN of the neighbour cell is the same as for the assistance data reference cell, the target device may assume that this cell has the same PRS periodicity (Tprs) as the assistance data reference cell.

In this case, PRS-Info corresponding to an IE, which is included in the OTDOA-ReferenceCellInfo and the OTDOA-NeighbourCellInfo, includes PRS information. Specifically, the PRS-Info is configured as follows while including PRS Bandwidth, PRS Configuration Index (IPRS), Number of Consecutive Downlink Subframes, and PRS Muting Information.

TABLE 12

```
PRS-Info ::= SEQUENCE {
  - prs-Bandwidth          ENUMERATED {n6, n15, n25, n50, n75,
    n100, ... },
  - prs-ConfigurationIndex INTEGER (0..4095),
  - numDL-Frames           ENUMERATED {sf-1, sf-2, sf-4, sf-
    6, ...},
  - ...,
  - prs-MutingInfo-r9      CHOICE {
         1. po2-r9                            BIT STRING
            (SIZE(2)),
         2. po4-r9                            BIT STRING
            (SIZE(4)),
         3. po8-r9                            BIT STRING
            (SIZE(8)),
         4. po16-r9                           BIT STRING
            (SIZE(16)),
         5. ...
      B. }
           OPTIONAL             -- Need OP
  - }
  - -- ASN1STOP
```

Figure 6:
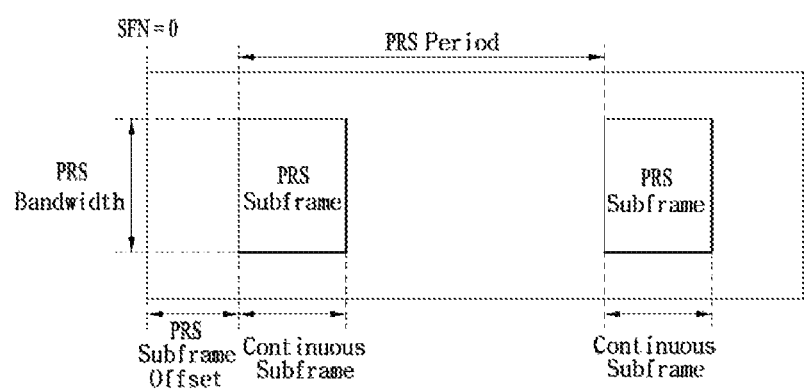
FIG. 6 is a diagram for a PRS transmission structure.

FIG. 6 is a diagram for a PRS transmission structure according to the parameters.

In this case, PRS periodicity and PRS subframe offset are determined according to a value of PRS configuration index (IPRS) and a corresponding relation is shown in the following table.

TABLE 13

| PRS Configuration Index ($I_{PRS}$) | PRS Periodicity (subframes) | PRS Subframe Offset (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-23399 | 1280 | $I_{PRS}$ − 1120 |

[PRS (Positioning Reference Signal)]

A PRS has a transmission occasion (i.e., positioning occasion) with a period of 160, 320, 640, or 1280 ms and the PRS can be transmitted during N number of contiguous DL subframes in the positioning occasion. In this case, the N may have a value selected from the group consisting of 1, 2, 4, and 6. Although the PRS is practically transmitted in the positioning occasion, the PRS can be muted for inter-cell interference controlling coordination. Information on the PRS muting is signaled to a UE using prs-MutingInfo. Unlike a system bandwidth of a serving eNB, a bandwidth on which the PRS is transmitted can be independently configured. The PRS is transmitted on a frequency band of 6, 15, 25, 50, 75, or 100 RBs (resource blocks). A transmission sequence of the PRS is generated by initializing a pseudo-random sequence generator in every OFDM symbol using such a function as a slot index, an OFDM symbol index, a CP (cyclic prefix) type, and a cell ID. The generated transmission sequences of the PRS can be differently mapped to resource elements (REs) according to a normal CP or an extended CP. A position of an RE to which the transmission sequence of the PRS is mapped may shift on a frequency axis. A shift value can be determined by a cell ID.

A UE receives configuration information on a list of PRSs to be searched from a location management server of a network to measure the PRSs. The configuration information includes PRS configuration information of a reference cell and PRS configuration information of neighboring cells. Each of the PRS configuration information includes an occurrence cycle of a positioning occasion and offset, the number of contiguous DL subframes constructing a positioning occasion, a cell ID used for generating a PRS sequence, a CP type, the number of CRS antenna ports considered when PRS is mapped, and the like. In addition to this, the PRS configuration information of the neighboring cells includes a slot offset and a subframe offset between a neighboring cell and a reference cell, an anticipated RSTD, and the extent of uncertainty of the anticipated RSTD to support a UE to determine timing and a time window for detecting a PRS transmitted from the neighboring cell.

For example, FIG. 7 is a diagram for RE mapping of a PRS. In this case, a transmission sequence of the PRS can be generated by initializing a pseudo-random sequence generator in every OFDM symbol using such a function as a slot index, an OFDM symbol index, a CP (cyclic prefix) type, and a cell ID. If the generated sequences correspond to a normal CP, mapping can be performed as shown in FIG. 7 (a). If the generated sequences correspond to an extended CP, mapping can be performed as shown in FIG. 7 (b). A position of an RE to which the transmission sequence of the PRS is mapped may shift on a frequency axis. A shift value can be determined by a physical cell ID. In this case, for example, in FIGS. 7 (a) and (b), a position of a PRS transmission RE shows a case that a frequency shift corresponds to 0.

Meanwhile, the RSTD corresponds to a relative timing difference between an adjacent or neighboring cell j and a reference cell i. In particular, the RSTD can be represented as $T_{subframeRxj} - T_{subframeRxi}$. In this case, the $T_{subframeRxj}$ corresponds to timing at which a UE receives the start of a specific subframe from the neighboring cell j and the $T_{subframeRxi}$ corresponds to timing at which the UE receives the start of a subframe corresponding to the specific subframe from the reference cell i. The timing corresponds to timing nearest from the specific subframe received from the neighboring cell j in time. A reference point for an examined subframe time difference corresponds to an antenna connector of the UE.

As mentioned in the foregoing description, a network may use various methods to obtain location information of a UE in a wireless communication system. In this case, if it is able to track a location of the UE via the methods, it may be able to utilize it for LBS (location-based service). In this case, the aforementioned location tracking methods are already supported by 3GPP UTRA and E-UTRA standard (e.g., LTE Rel-9), by which the present invention may be non-limited. Yet, the location tracking methods can be mainly applied to a case that a UE is located at outdoor environment. It may be difficult to secure location tracking accuracy for UEs located at indoor environment. Hence, recently, higher accuracy is required for an in-building positioning scheme.

For example, it may use the aforementioned A-GNSS scheme. Yet, since the A-GNSS scheme requires a GNSS receiver, the A-GNSS scheme may have a limitation point in terms of complexity, battery consumption, and the like. And, although the legacy positioning schemes such as E-CID, OTDOA, and UTDOA correspond to technologies capable of being commonly applied to outdoor/indoor environment, positioning accuracy of the technologies is low in general. For example, in case of using E-CID scheme, it is known as a positioning error of the technology is 150 m and 50 m in NLOS (non-line of sight) environment and LOS environment, respectively. In particular, the positioning error may increase in the NLOS environment. Although LOS environment is secured, a prescribed error may exist as well.

And, the OTDOA scheme based on a PRS also has a limitation point that a positioning error exceeds 100 m due to an eNB synchronization error, an error caused by multipath propagation, an RSTD measurement quantization error of a UE, a timing offset estimation error, and the like.

And, when a UE receives a PRS from an eNB, if strength of the PRS is weak, an error of RSTD may increase. In case of UTDOA performing location tracking using an UL signal, performance can be degraded due to the problems in the OTDOA. In particular, since the UTDOA uses an SRS (sounding reference signal) of UL, RSTD, which is calculated using SRSs received from a plurality of eNBs, may have a big error due to the limitation of transmit power of the UE. In particular, the SRS corresponds to a signal transmitted to the eNB by the UE. In this case, since strength of the signal and the power is weak, it may have a limitation in performing location tracking using the SRS. And, for example, when the SRS is used, since it is necessary to know absolute time of the eNB, there may exist a limitation. For this reason, when locations of UEs far from the eNB are obtained using the UTDOA scheme, accuracy of the locations can be considerably degraded.

Figure 8:
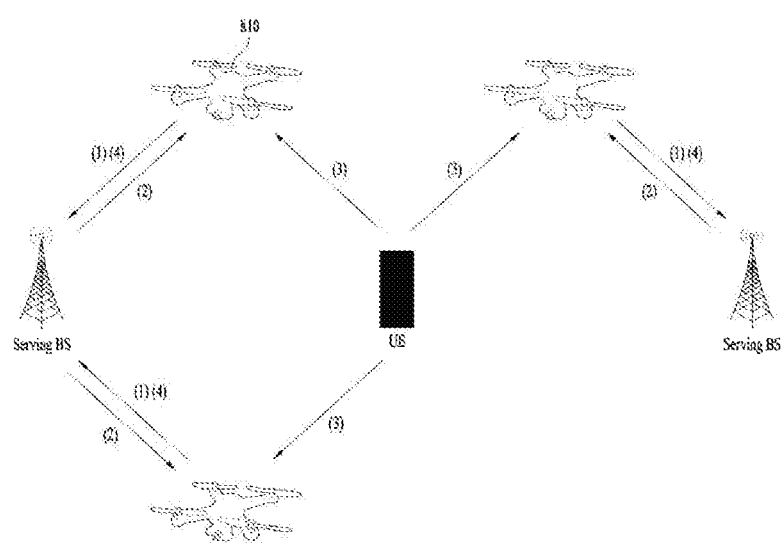
FIG. 8 is a diagram for a method of tracking a location of a terminal using a drone.

In this case, referring to FIG. 8, it may be able to perform UTDOA-based location tracking by utilizing a drone. A drone may correspond to an unmanned flying object capable of performing communication. And, for example, the drone may correspond to a terminal capable of more securing LOS compared to a legacy terminal. In particular, similar to a legacy terminal, the drone may correspond to a device capable of performing communication with other terminals and the device having superior LOS compared to the legacy terminal. In the following description, although a device is referred to as a drone in relation to a device operation, a terminal capable of securing LOS may also correspond to a drone, by which the present invention may be non-limited. And, the aforementioned device can also be referred to as a different name rather than the drone, by which the present invention may be non-limited.

When a sufferer occurs at the out-coverage of an eNB or the sea or mountain where strength of a signal is weak and it is necessary to track the location of the sufferer, a drone can be used. In particular, in order to perform communication in a region not covered by the eNB, a drone can be used. For example, since the drone corresponds to a flying object, the drone can be located at a disaster area such as the outside of the coverage of the eNB or the sea or the mountain where strength of a signal is weak by flying to the area. And, since the drone corresponds to a flying object, it may be able to secure LOS.

Hence, in case of performing positioning by utilizing a drone, it may be able to increase accuracy compared to a legacy case. In the following, a method of performing UTDOA-based location tracking using a drone is explained. In this case, for example, it may be able to track a location of a UE based on UTDOA using reference signals of UEs located near a drone by flying the drone to a predetermined place or a predetermined location. In this case, for example, the drone used for tracking a location can obtain location information using GNSS at a predetermined location. And, for example, the drone may be able to maintain a fixed position at a predetermined location. By doing so, the drone can perform a positioning scheme for location tracking of a different terminal. For example, the drone may stay in a stationary state via a hovering function, by which the present invention may be non-limited.

More specifically, referring to FIG. 8, a location of a UE 820 can be identified via a drone 810. In this case, the drone can be registered at a network. For example, if power of the drone 810 is turned on, similar to a general LTE terminal, the drone can be registered at the network via cell search and initial access. For example, similar to a legacy LTE terminal, the drone 810 can be registered at the network (or eNB) via a RACH (random access channel). In this case, the drone can measure a CSI-RS (channel statement information-reference signal), a CRS (common reference signal), a PRS, and the like in an initial registration procedure. For example, the drone 810 can identify information on a channel state, and the like in a relation with an eNB by performing measurement on a CSI-RS and a CRS. And, as mentioned in the foregoing description, the drone 810 can report an RSRP value and an RSTD value for OTDOA to the network (or eNB) using the PRS. By doing so, the network can identify an initial location of the drone 810. Subsequently, the drone 810 may be able to move to a predetermined place (or a preconfigured position) using a GNSS signal.

In this case, the drone 810 can consistently measure a CSI, a CRS, a PRS, and the like transmitted by a neighboring eNB while the drone is moving. By doing so, the drone 810 can transmit information to an eNB in consideration of a relation with the eNB. And, the drone 810 can consistently report the aforementioned RSRP value and the RSTD value for ODTOA to the eNB while the drone is moving. For example, a network end can consistently check whether or not the drone 810 is moving to a predetermined place (or a preconfigured position) through the consistently reported information, by which the present invention may be non-limited.

Subsequently, when the drone 810 arrives at the predetermined place, the drone can perform an initial access procedure again to select an eNB providing the best link to enhance accuracy of location tracking. In other word, if the drone 810 arrives at the predetermine place, the drone can perform an initial access again with neighboring eNBs. In this case, the drone 810 can receive a CSI-RS, a CRS, a PRS, and the like from eNBs registered via the initial access. The drone 810 can perform measurement using received reference signals. In this case, the drone 810 can report the RSRP value and the RSTD value for OTDOA to the network end via the PRS. The drone 810 can transmit a signal indicating that the drone has arrived at the predetermined place to the network end based on the values. In particular, the drone 810 can report not only measurement information based on a reference signal but also information indicating that the drone has arrived at the predetermined place to an eNB. By doing so, the network end can identify whether or not a location of the drone 810, which is tracked based on OTDOA, is located at the predetermined place.

In this case, if the drone 810 is located within a prescribed error range from the predetermined place, the network end can determine it as the drone 810 is ready to perform location tracking. For example, if an error between the location of the drone, which is tracked based on OTDOA, and the predetermined place is big, the network end may not use the drone 810 as a device for performing location tracking.

As a different example, the drone 810 can consistently receive information on a CSI, a CRS, a PRS, and the like from the network end. The drone 810 can consistently transmit measurement information to the network end based on the reference signal. In this case, if the measurement information considerably changes, as mentioned in the foregoing description, the drone 810 may perform a procedure of returning to a predetermine location by performing location tracking again.

In particular, if it is determined that the drone 810 moves to a predetermined location and the drone is in a stationary state at the predetermined location while the range of fluctuation is within an error range, as mentioned in the foregoing description, the network end can use the drone as a device for performing location tracking.

Figure 9:
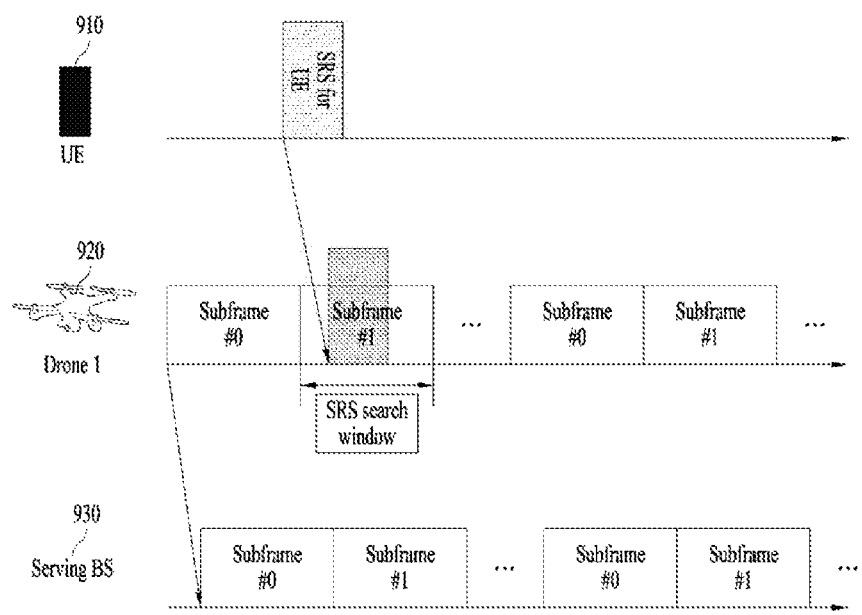
FIG. 9 is a diagram of a method for a drone to receive an SRS from a terminal in an SRS (sounding reference signal) search window.

FIG. 9 is a diagram of a method for a drone to receive an SRS from a terminal in an SRS (sounding reference signal) search window.

As mentioned in the foregoing description, if a drone 920 arrives at a predetermine place, a network end can provide information on SRS signals of UEs 910 to the drone to track locations of the UEs. In this case, for example, the network end may correspond to a serving base station 930. The serving base station 930 can inform the drone 920 of SRS information on a UE or UEs to be tracked. In particular, the drone 920 can track a location of the UE 910 based on UTDOA scheme using the SRS information on the UE 910. In this case, for example, the SRS information on the UE 910 received from the serving base station 930 may correspond to an SRS bandwidth, an SRS search window, or the like. In this case, the SRS bandwidth may correspond to a bandwidth on which an SRS signal is transmitted. And, the SRS search window may correspond to information on a period for searching for TOA indicating that an SRS arrives at the drone 920. And, the drone 920 can receive different information related to an SRS from the serving base station 930, by which the present invention may be non-limited.

And, for example, the drone 920 can revise uplink transmission timing via TA (time advance) received from the serving base station 930 in an initial registration procedure. In this case, a subframe index of the drone 920 can be configured to be matched with a subframe index of the serving base station 930. As mentioned in the foregoing description, the serving base station 930 can transmit information on the SRS search window to the drone 920 based on the revised uplink transmission timing.

For example, referring to FIG. 9, a UE can transmit an SRS. In this case, the drone 920 can configure an SRS search window period to search for a TOA value of the SRS transmitted by the UE 910. In this case, the SRS search window can be configured in a subframe unit. For example, in FIG. 9, when a subframe index corresponds to 1, it can be configured as the SRS search window. And, information on the SRS search window configured by the drone 920 can be received from the serving base station 930. In this case, as mentioned in the foregoing description, since the subframe index of the drone 920 is configured to be matched with the subframe index of the serving base station 930, the serving base station 930 can provide the information on the SRS search window to the drone 920 based on the matched subframe index. In particular, since the subframe index of the drone 920 is configured to be identical to the subframe index of the serving base station 930, it is able to efficiently indicate the information on the SRS search window, which is configured in a subframe unit.

Figure 10:
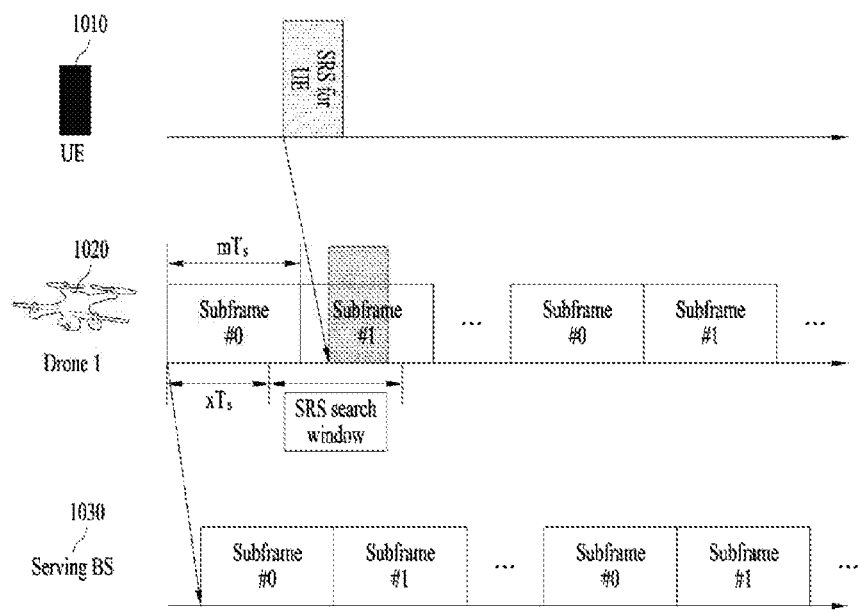
FIG. 10 is a diagram of a method for a drone to receive an SRS from a terminal in an SRS (sounding reference signal) search window.

As a different example, referring to FIG. 10, the SRS search window can be configured in a $T_s$ (sampling rate) unit.

In this case, since the SRS search window is configured in the $T_s$ unit, a start point and an end point of the SRS search window may not be matched with a subframe. For example, since the SRS search window is not configured in a subframe unit, it may reduce a size of the SRS search window. By doing so, it may be able to reduce complexity of calculating TOA of an SRS calculated by a drone 1020.

Yet, in the abovementioned situation, it is necessary for a serving base station 1030 to provide information on the start point and the end point of the SRS search window to the drone 1020. In this case, for example, the serving base station 1030 can provide the information on the SRS search window to the drone 1020 as quantized information. To this end, it is necessary for the serving base station 1030 to quantize information on subframe numbers of the start point and the end point of the SRS search window and information on offset in a corresponding subframe and provide the quantized information to the drone 1020.

For example, referring to FIG. 10, in order to inform the drone of the start point of the SRS search window, it may be able to perform quantization on subframe number=0 and $xT_s$ corresponding to an offset value. In this case, since a subframe number corresponds to index information, the subframe number can be quantized with a less bit. Yet, since the $xT_s$ value, which is the offset value, corresponds to an offset value based on length information in a subframe, it is necessary to configure the $xT_s$ value in consideration of a quantization level.

In this case, for example, when a length of a subframe corresponds to mTs and a quantization level corresponds to $2^Q$, a minimum unit of quantization can be represented as equation 1 in the following.

$$\text{Quantization minimum unit} = \frac{mTs}{2^Q} \qquad \text{[Equation 1]}$$

In this case, if it is assumed that m corresponds to 15360 and Q corresponds to 10, the quantization minimum unit becomes 15360/(2^10)Ts=15 Ts. For example, if the drone receives 00 0000 1111 (=15), the drone is able to obtain 15 Ts*15=225 Ts. Hence, the drone is able to obtain an offset value of xTs=225 Ts.

In particular, if the SRS search window is configured in the $T_s$ unit, as mentioned in the foregoing description, the serving base station 1030 can inform the drone 1020 of information on a subframe number and offset information. In this case, the aforementioned quantization value can be forwarded via a higher layer signal. For example, the higher layer signal may correspond to RRC signaling. In particular, the drone 1020 is able to know the equation for the aforementioned quantization, the m value, and the Q value via the higher layer signal. In this case, the drone 1020 can calculate the offset value based on the value (e.g., 00 0000 1111 (=15)) received from the serving base station 1030 and may be able to know the start point and the end point of the SRS search window based on the offset value.

Figure 11:
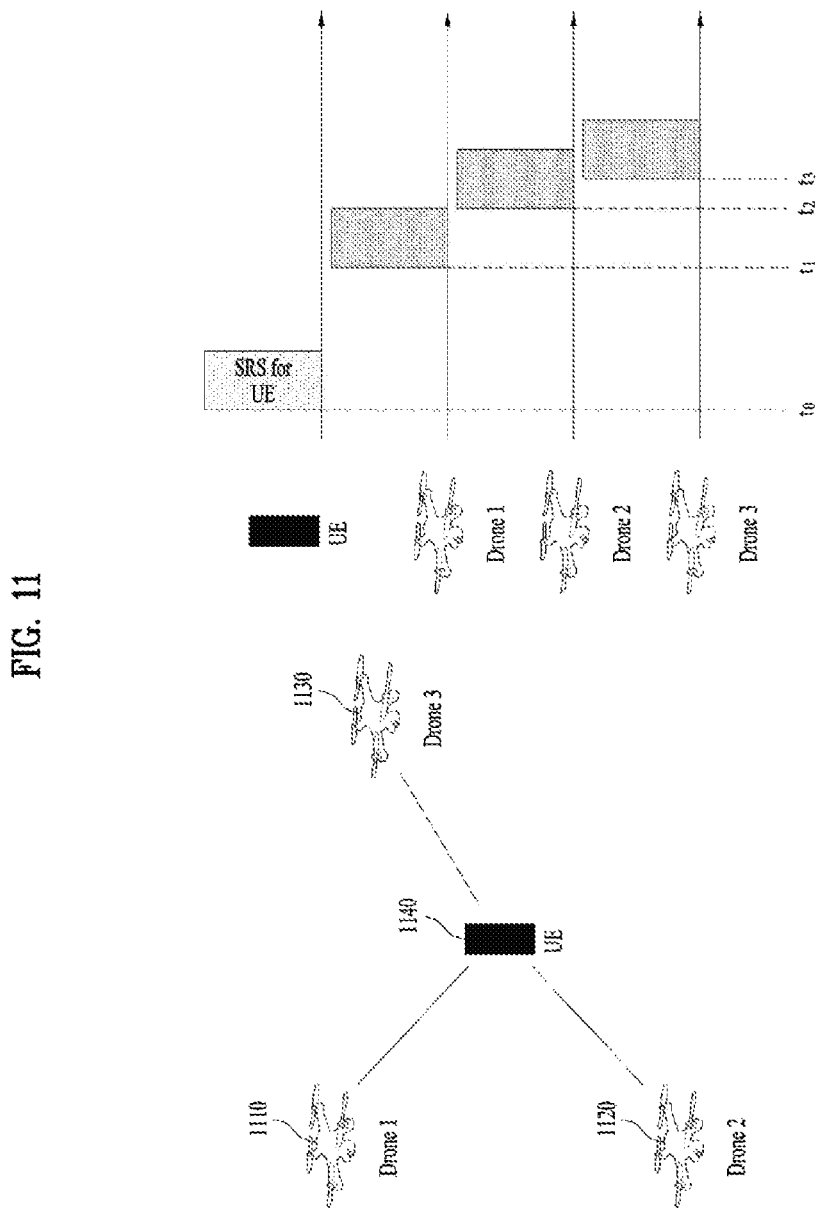
FIG. 11 is a diagram for a method of tracking a location of a terminal using a plurality of drones.
Figure 12:
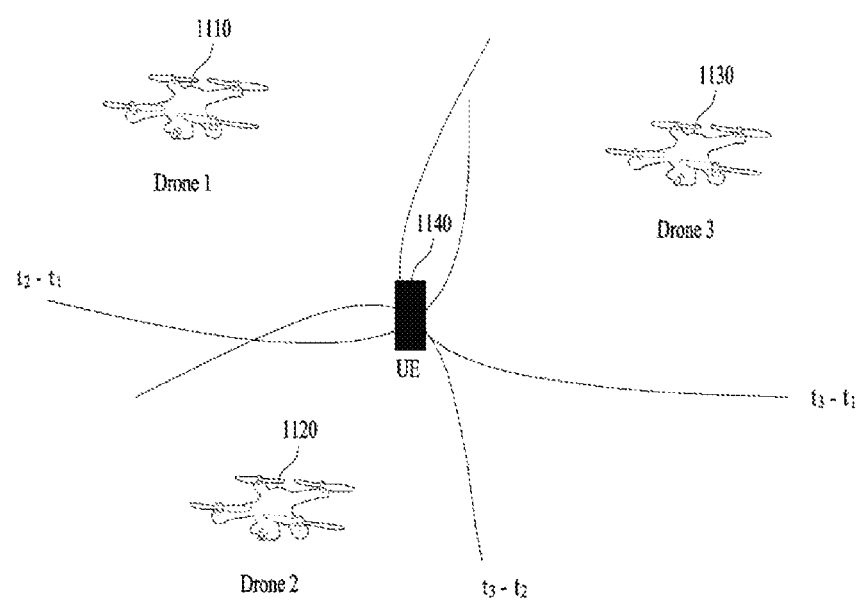
FIG. 12 is a diagram for a method of tracking a location of a terminal using a plurality of drones.

FIGS. 11 and 12 are diagrams for a method of tracking a location of a terminal using a drone. As mentioned in the foregoing description, a drone can receive information on an SRS from a neighboring base station (or a network end). In this case, for example, the information on the SRS can include information on a bandwidth on which the SRS is transmitted, information on an SRS search window, and the like. Besides, other information can be included in the information on the SRS.

In this case, for example, the drone can measure TOA of an SRS transmitted by a UE based on the information received from the serving base station. In this case, the drone can transmit information on the measured TOA to the serving base station (or a network end) and the network end can track a location of the UE using the information on the measured TOA received from a plurality of drones.

For example, referring to FIG. 11, a first drone 1110, a second drone 1120, and a third drone 1130 can respectively measure TOA of an SRS transmitted by a UE 1140. In this case, time at which the SRS is transmitted by the UE 1140 may correspond to $t_0$. And, TOA of the SRS transmitted by the UE in the first drone 1110 may correspond to $t_1$. And, TOA of the SRS transmitted by the UE in the second drone 1120 may correspond to $t_2$ and TOA of the SRS transmitted by the UE in the third drone 1130 may correspond to $t_3$. In this case, each of the drones 1110/1120/1130 can transmit information on the TOA to each serving base station. A network end can measure a location of the UE 1140 using the TOA information received from the drones 1110/1120/1130.

More specifically, referring to FIG. 12, each of the drones 1110/1120/1130 can obtain time difference information based on a distance. In particular, each of the drones 1110/1120/1130 can obtain information on a difference between the TOA values based on the TOA values of the SRS as arrival information of the SRS received by each of the drones 1110/1120/1130 from the UE 1140. For example, referring to FIG. 12, it may be able to obtain information such as $t_2-t_1$, $t_3-t_1$, and $t_3-t_2$ using the 3 drones 1110/11120/1130. In this case, as mentioned in the foregoing description, since the drones 1110/1120/1130 are respectively designated by a predetermined location, it may be able to track a location of the UE 1140 using the locations of the drones 1110/1120/1130 and the time difference information.

In this case, in order to track the location of the UE 1140, as mentioned in the foregoing description, it is necessary for the network end to obtain information on TOA values measured from the drones 1110/1120/1130. Yet, the TOA values can be reported via the aforementioned quantization method in consideration of overhead and latency.

More specifically, as mentioned in the foregoing description, a subframe index of the drone is configured to be matched with a subframe index of the serving base station. In this case, the drone can quantize a TOA value on the basis of uplink transmission timing revised via TA (time advance) received from the serving base station. This can be represented as the aforementioned equation 1. The serving base station (or the network end) can obtain information on TOA values ($t_1$, $t_2$, $t_3$) in the drone using the quantized value.

Figure 13:
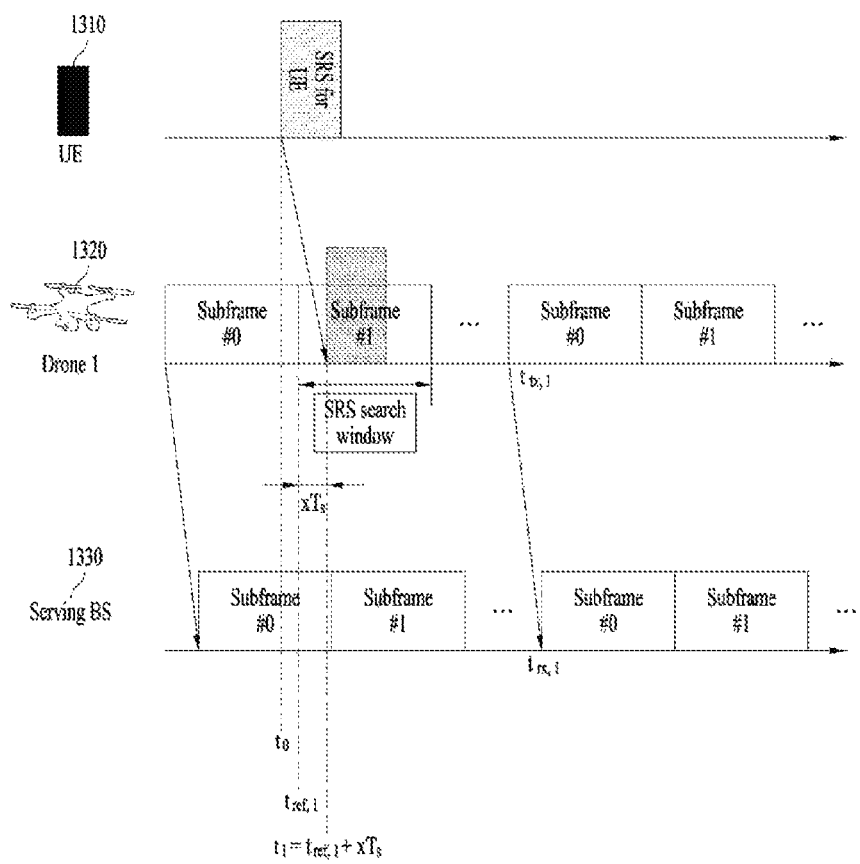
FIG. 13 is a diagram of a method for a drone to transmit TOA (Time Of Arrival) information to a base station.

For example, FIG. 13 is a diagram for a method of obtaining a quantized TOA value. In this case, for example, the timing at which an SRS is transmitted by the UE 1310 may correspond to the $t_0$. A start point of an SRS search window in a first drone 1320 may correspond to $t_{ref,1}$. In this case, the first drone 1320 can receive an SRS after time elapses as much as $xT_s$ from the start point of the SRS search window. In particular, the $t_1$ corresponding to the TOA measurement value of the SRS in the first drone 1320 can be represented as equation 2 described in the following.

$$t_1 = t_{ref,1} + xT_s \qquad \text{[Equation 2]}$$

In this case, the first drone 1320 quantizes a value of x and can forward the quantized x value to the serving base station 1330. In this case, for example, it may consider a case that a length of a subframe corresponds to mTs. In this case, as mentioned in the foregoing description, if a quantization level corresponds to $2^Q$, as mentioned earlier in the equation 1, a minimum unit of the quantization may become $$\frac{mTs}{2^Q}.$$

For example, if it is assumed that m corresponds to 15360 and Q corresponds to 10, the minimum unit of the quantization becomes 15360/(2^10)Ts=15 Ts. Hence, if the first drone 1320 forwards 00 0000 1111 (=15) to the serving base station 1330, the serving base station obtains a value of 15 Ts*15=225 Ts and may be then able to obtain information on the $t_1$ value based on $t_{ref,1}$ value. In this case, for example, the first drone 1320 may report information on x only to the serving base station 1330 and, as mentioned in the foregoing description, information on other quantization can be forwarded via a higher layer signal such as RRC signaling. In this case, since the abovementioned procedure is identically applied to a plurality of different drones, the network end can obtain each of TOA information.

For example, the serving base station calculates TOA values ($t_1$, $t_2$, and $t_3$) based on the information received from the drone and can forward the calculated TOA values to a location tracking server. In this case, since the base station is equipped with an LMU (location measurement unit), the base station may measure precise absolute time. However, since the LMU is not efficient for the drone in terms of price and complexity, the LMU may not be installed in the drone. The base station is able to know absolute time at which each subframe starts using the LMU.

Figure 14:
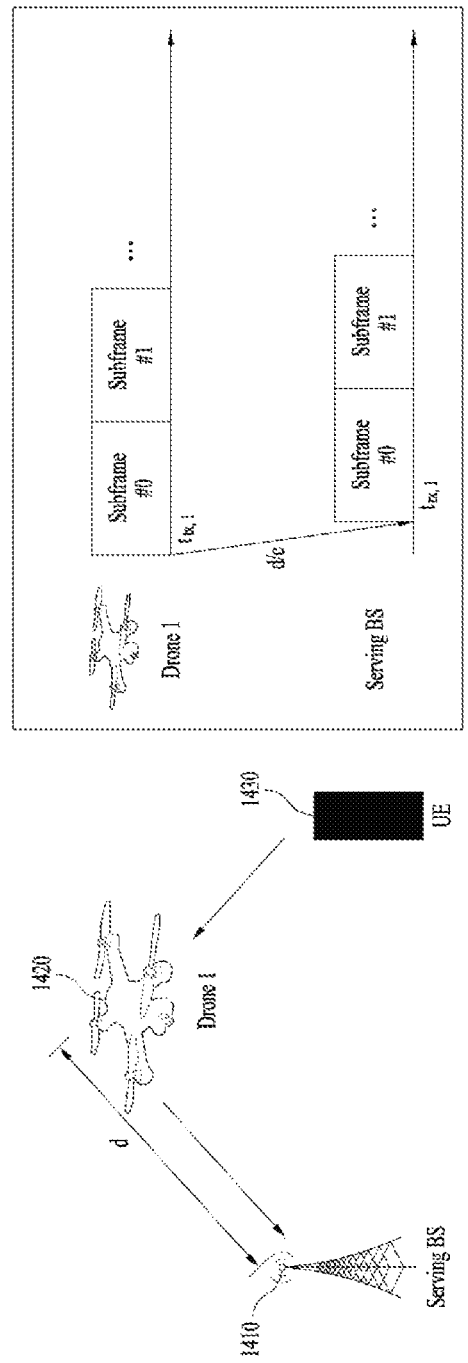
FIG. 14 is a diagram of a method for a drone to transmit TOA information to a base station.

More specifically, referring to FIG. 14, a serving base station 1410 is able to know a value of $t_{rx,1}$ via the LMU. In this case, as mentioned in the foregoing description, since a drone 1420 is fixed with a predetermined location, a distance between the serving base station 1410 and the drone 1420 can be consistently determined. Hence, as shown in equation 3 in the following, information on absolute time of a subframe #0 transmitted by the drone 1420 can be obtained using the $t_{rx,1}$ obtained via the LMU of the serving base station 1410 and a value of d corresponding to a fixed length between the serving base station 1410 and the drone 1420.

$$t_{tx,1} = t_{rx,1} - \frac{d}{c} \quad \text{[Equation 3]}$$

In this case, a value of c may correspond to a speed of a signal. It may be able to estimate start time of every subframe of the drone 1420 based on the value of c.

In this case, as mentioned in the foregoing description, the drone 1420 may obtain the aforementioned $t_{rx,1}$ via a TA value received from the serving base station 1410. However, when time estimation is performed via a direct distance between the serving base station 1410 and the drone 1420 in consideration of resolution of TA, it may have more accurate time estimation, by which the present invention may be non-limited. By doing so, the serving base station 1410 can obtain a precise TOA value ($t_1=t_{ref,1}+xT_s$) of an SRS transmitted by the UE 1430 via the $t_{ref,1}$ corresponding to the start point of the SRS search window and the quantized TOA value forwarded to the serving base station 1410 by the drone 1420. The serving base station forwards the precise TOA value to a location tracking server to track a location of the UE 1430.

When the serving base station transmits the TOA value to the location tracking server, the serving base station can transmit C-RNTI of the drone used for obtaining the TOA value and a cell ID value to the location tracking server as well. In this case, for example, it may be able to identify a drone used for tracking a location of a specific UE via the C-RNTI of the drone. And, since it is able to know a fixed position of the drone when the drone searches for an SRS, it may be able to estimate a location of a UE via multilateral measurement. And, for example, the serving base station can make the drone obtain a TOA value from a drone having the same serving base station via the cell ID. In particular, if a location is tracked via drones connected with the single serving base station, it may be able to reduce an error in estimating a location due to a difference of LMU between base stations. In particular, if the serving base station transmits both identification information of a drone and identification information of a cell to the location tracking server, it may be able to enhance accuracy of location tracking, by which the present invention may be non-limited.

Figure 15:
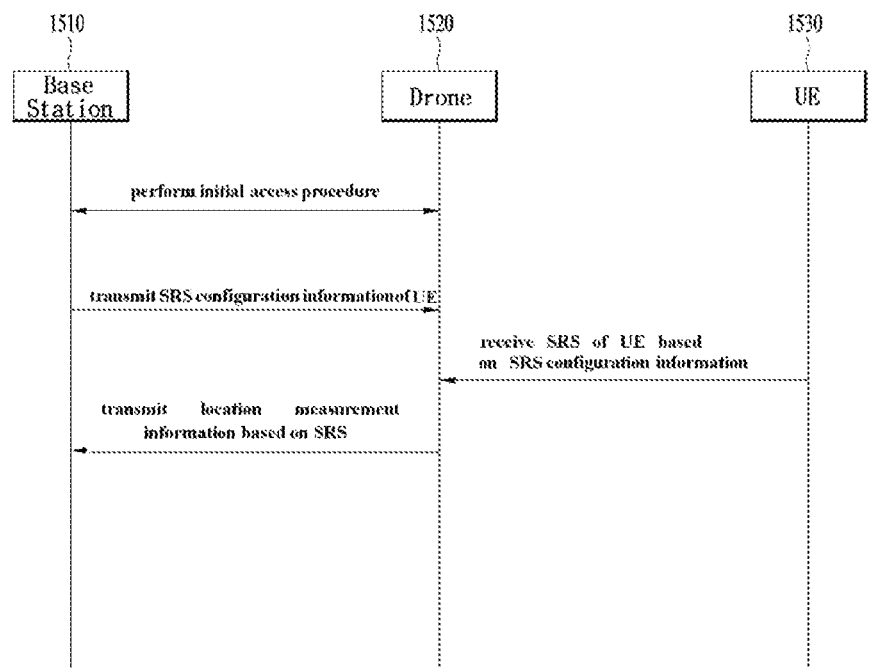
FIG. 15 is a diagram of a method for a drone to track a location of a terminal.

FIG. 15 is a diagram of a method for a drone to track a location of a terminal.

Referring to FIG. 15, a drone 1520 can perform an initial access procedure with a base station 1510. In this case, for example, the initial access procedure may correspond to a RACH procedure. And, for example, when power of the drone 1520 is turned on, the drone can perform the initial access procedure. Subsequently, if the drone 1520 moves to a predetermined position, the drone can perform the initial access procedure again with a serving base station 1510 having the best link quality at the predetermined position. In this case, for example, as mentioned in the foregoing description, link quality can be measured based on channel state information, and the like.

Subsequently, the drone 1520 can receive SRS configuration information of a UE from the base station 1510. In this case, as mentioned in the foregoing description, the SRS configuration information can include at least one of SRS bandwidth information and SRS search window information. And, the drone can receive other information on SRS configuration, by which the present invention may be non-limited. In this case, for example, an SRS search window of the SRS configuration information may correspond to a period configured to receive an SRS from the UE 1530 by the drone 1520. In this case, for example, the drone 1520 receives TA information from the base station 1510 and may be able to match subframe indexes with each other based on the TA information. In particular, it may be able to configure a subframe index of the drone 1520 to be matched with a subframe index of the base station 1510 based on the TA information. In this case, the SRS search window can be configured in a subframe unit. In particular, the base station 1510 may set a period capable of receiving an SRS of the UE 1530 to the drone 1520.

As a different example, the SRS search window can be configured in a sampling unit. In this case, the base station 1510 can indicate subframe numbers of a start point and an end point of the SRS search window to the drone 1520. And, since the SRS search window is configured in the sampling unit, it may be able to provide offset information to the drone 1520 on the basis of a start point or an end point of a subframe. By doing so, the drone 1520 can obtain information on an SRS search window period. And, for example, the information on the SRS search window can be provided to the drone 1520 through quantization. In this case, as mentioned in the foregoing description, information on the quantization can be forwarded via a higher layer signal such as RRC signaling. By doing so, the base station 1510 can transmit information on a specific value only to the drone 1520 based on the quantization.

Subsequently, the drone 1520 can receive an SRS from the UE 1530 in the configured SRS search window. In this case, the drone 1520 can calculate TOA information corresponding to information on the timing at which the SRS is received by the drone 1520 from the timing at which the SRS is transmitted by the UE 1530. As mentioned in the foregoing description, since the drone 1520 is fixed at a predetermined position, it may be able to measure the location of the UE 1530 via the TOA information. More specifically, as mentioned earlier in FIG. 15, the drone 1520 can transmit the TOA information to the base station 1510 as location measurement information measured based on an SRS. In this case, the base station 1510 can receive the TOA information from a plurality of drones 1520. In particular, the base station 1510 can measure a location of the UE 1530 through location information received from a plurality of the drones 1520 and locations of the fixed drones 1520. And, for example, the base station 1510 can transmit location measurement information received from a plurality of the drones 1520 to a location tracking server. In this case, the base station 1510 can transmit C-RNTI of each of a plurality of the drones and cell ID information to the location tracking server together with the location measurement information. By doing so, the location tracking server can measure a location of the UE 1530 in consideration of a location of the drone 1520 and the base station 1510 to which the drone 1520 has accessed, by which the present invention may be non-limited.

Figure 16:
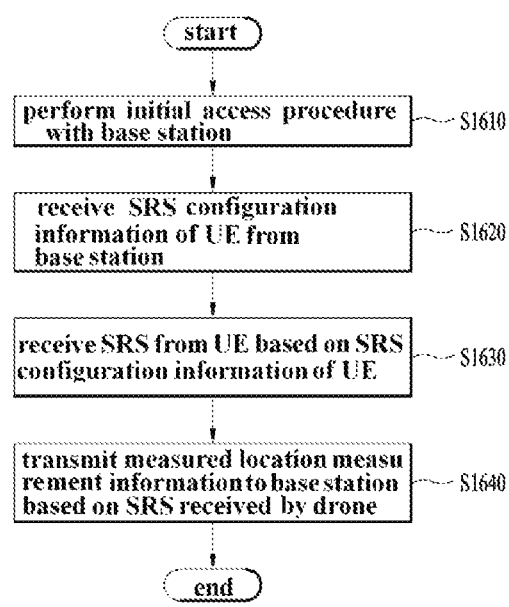
FIG. 16 is a diagram of a method for a drone to track a location of a terminal.

FIG. 16 is a diagram of a method for a drone to track a location of a terminal.

A drone can perform an initial access procedure with a base station [S1610]. In this case, as mentioned earlier in FIGS. 8 to 15, the drone can perform the initial access procedure when power of the drone is turned on and the drone moves to a predetermined position.

Subsequently, the drone can receive SRS configuration information of a UE [S1620]. In this case, as mentioned earlier in FIGS. 8 to 15, the SRS configuration information can include at least one of SRS bandwidth information and SRS search window information. As mentioned in the foregoing description, the drone can receive an SRS transmitted from the UE in a predetermined period based on the SRS search window information.

Subsequently, the drone can receive an SRS from the UE based on the SRS configuration information of the UE [S1630]. In this case, as mentioned earlier in FIGS. 8 to 15, the drone can receive the SRS transmitted from the UE in an SRS search window period. In this case, the drone can obtain a TOA value in consideration of the timing at which the SRS is arrived. In particular, the drone can obtain the TOA value in consideration of the timing at which transmission of the SRS starts and the timing at which the SRS is received by the drone. Subsequently, the drone can transmit location measurement information, which is measured based on the received SRS, to the base station [S1640]. In this case, as mentioned earlier in FIGS. 8 to 15, the location measurement information may correspond to a TOA value. In particular, the drone can transmit a TOA value which is measured based on the SRS to the base station. In this case, as mentioned in the foregoing description, the base station (or a network end) can measure a location of the UE using TOA values received from a plurality of drones.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

And, both an apparatus invention and a method invention are explained in the present specification and the explanation on both of the inventions can be complementally applied, if necessary.

What is claimed is:

1. A method of measuring a location of a user equipment by a drone in a wireless communication system, the method comprising:
   performing an initial access procedure with a base station while moving to a predetermined position;
   receiving, from the base station, sounding reference signal (SRS) configuration information of the user equipment comprising at least one of SRS bandwidth information and SRS search window information;
   receiving an SRS from the user equipment in a SRS search window period based on the SRS configuration information of the user equipment,
   wherein the SRS search window is configured in a subframe unit; and
   transmitting, to the base station, location measurement information measured based on the received SRS,
   wherein the drone matches a subframe index of the drone with a subframe index of the base station when performing the initial access procedure with the base station.

2. The method of claim 1, wherein the drone receives a time advance (TA) value from the base station and measures the location measurement information based on the received TA value.

3. The method of claim 1, wherein the drone reports an Reference Signal Received Power (RSRP) value and a Reference Signal Time Difference (RSTD) value of a neighboring base station to a base station while moving to the predetermined position.

4. The method of claim 3, wherein, when the drone performs the initial access procedure with the base station, the drone further transmits information to the base station to inform an arrival at the predetermined position based on the RSRP value and the RSTD value.

5. The method of claim 1, wherein the location measurement information corresponds to time of arrival (TOA) indicating information on a time at which the SRS transmitted from the user equipment is arrived.

6. The method of claim 5, wherein the base station receives the location measurement information from a plurality of drones and measures the location of the user equipment based on a plurality of the received location measurement information.

7. The method of claim 6, wherein the base station transmits a plurality of the received location measurement information to a location tracking server.

8. The method of claim 7, wherein a Cell Radio Network Temporary Identifier (C-RNTI) of each of the plurality of the drones and cell ID information are transmitted to the location tracking server when the base station transmits the plurality of the received location measurement information to the location tracking server.

9. A drone measuring a location of a user equipment in a wireless communication system, comprising:
a reception module configured to receive a signal;
a transmission module configured to transmit a signal; and
a processor configured to control the reception module and the transmission module,
wherein the processor is further configured to:
perform an initial access procedure with a base station while moving to a predetermined position,
receive, from the base station using the reception module, sounding reference signal (SRS) configuration information of the user equipment comprising at least one of SRS bandwidth information and SRS search window information,
receive, using the reception module, an SRS from the user equipment in SRS search window period based on the SRS configuration information of the user equipment, wherein the SRS search window is configured in a subframe unit, and
transmit, to the base station using the transmission module, location measurement information measured based on the received SRS,
wherein the drone matches a subframe index of the drone with a subframe index of the base station when performing the initial access procedure with the base station.

* * * * *